United States Patent [19]

Amelio

[11] 4,304,094

[45] Dec. 8, 1981

[54] ENGINE AIR PARTICLE SEPARATOR FOR USE WITH GAS TURBINE ENGINE

[75] Inventor: Armand F. Amelio, Yonkers, N.Y.

[73] Assignee: United Technologies Corp., Hartford, Conn.

[21] Appl. No.: 95,135

[22] Filed: Nov. 16, 1979

[51] Int. Cl.³ .................... F02C 7/042; F02C 7/052
[52] U.S. Cl. ................................ 60/39.09 P; 55/306
[58] Field of Search ..................... 60/39.09 P; 55/306

[56] References Cited

U.S. PATENT DOCUMENTS

| 3,421,296 | 1/1969 | Beurer | 55/306 |
| 3,483,676 | 12/1969 | Sargisson | 55/306 |
| 3,998,048 | 12/1976 | Derue | 55/306 |

Primary Examiner—Douglas Hart
Attorney, Agent, or Firm—Vernon F. Hauschild

[57] ABSTRACT

An engine air particle separator for use with a turbine engine and providing a first engine air flow path to the engine inlet in which foreign particles are separated from the air entering engine, and a second direct flow path for air to the engine inlet presenting minimum pressure drop and such that the ram air flows directly into the engine inlet. The second flow path includes actuatable blow-in doors which are actuated by a pneumatic door actuator mechanism operable to cause the doors to close upon the admission of air at operating pressure to the mechanism. Mechanism is provided to prevent the doors from opening when actuating air pressure is applied to the door actuator mechanism but falls below a preselected limit and to permit the doors to open in response to spring bias and ram pressure acting thereagainst when the air at actuating pressure is withdrawn.

10 Claims, 10 Drawing Figures

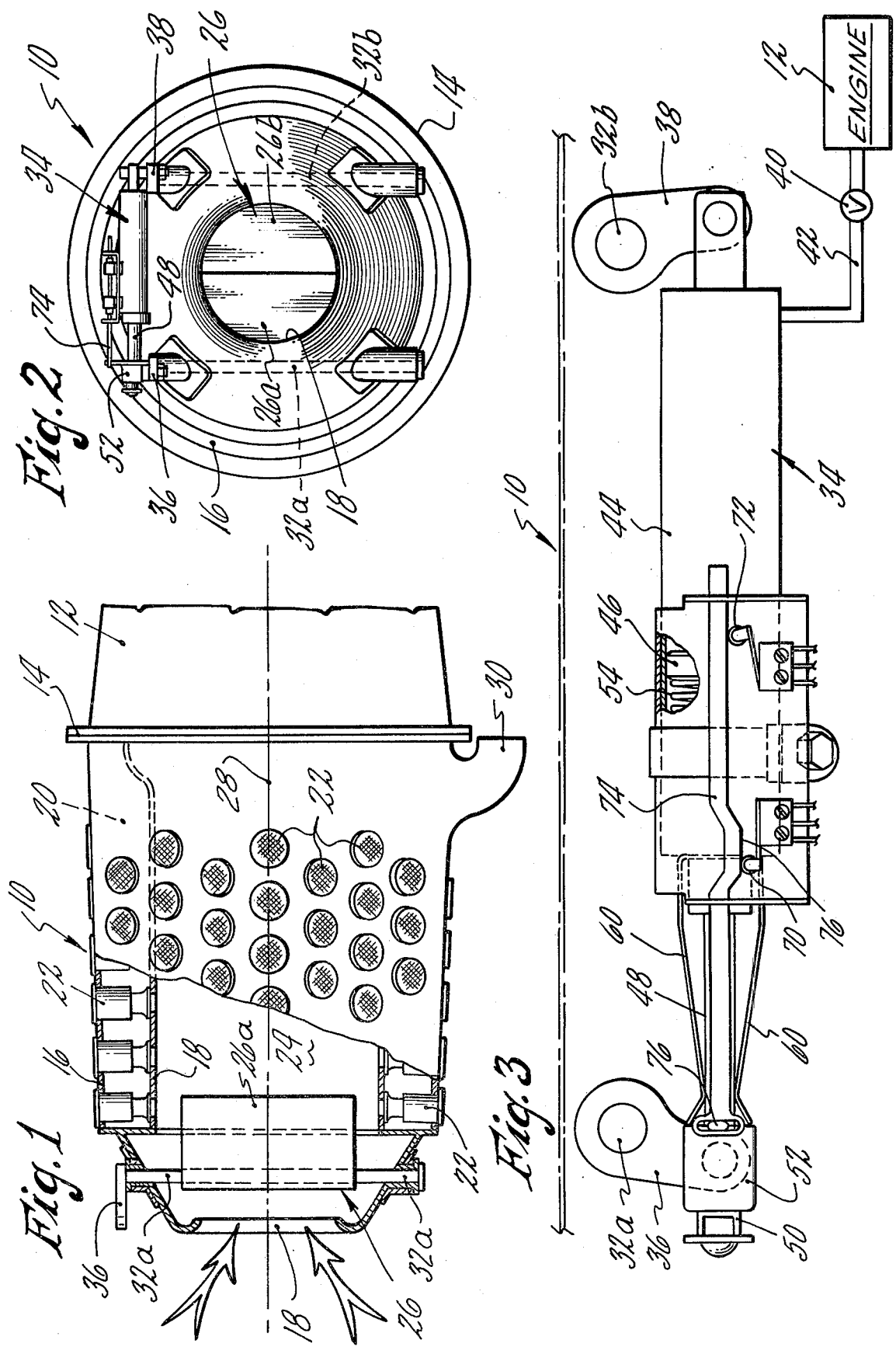

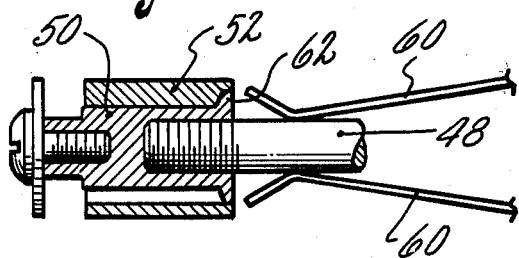
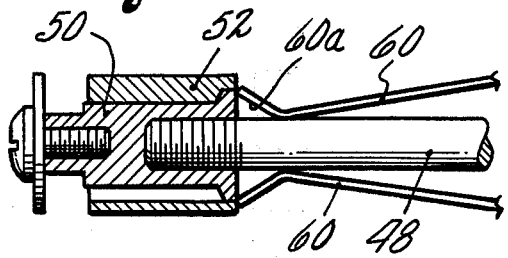
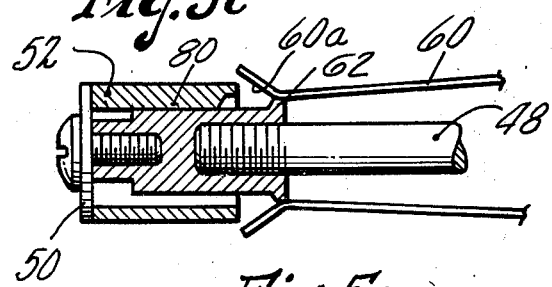
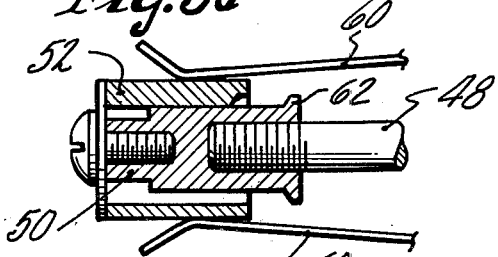
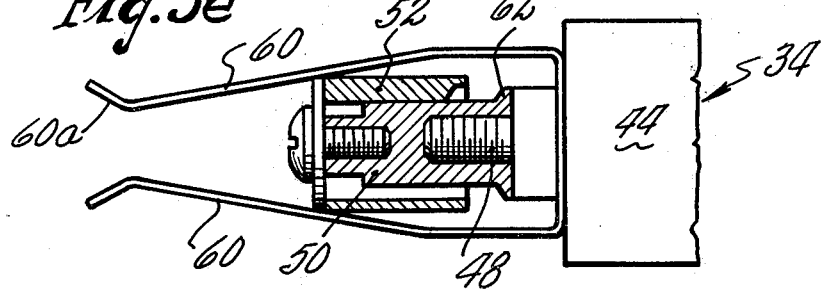
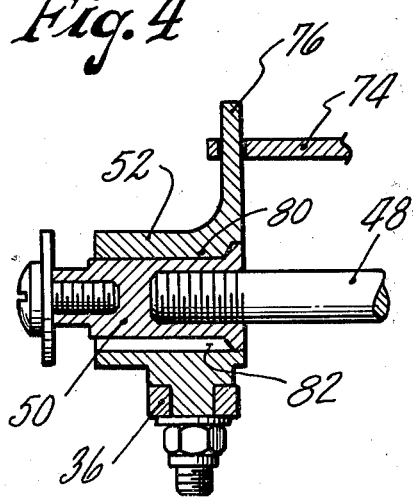
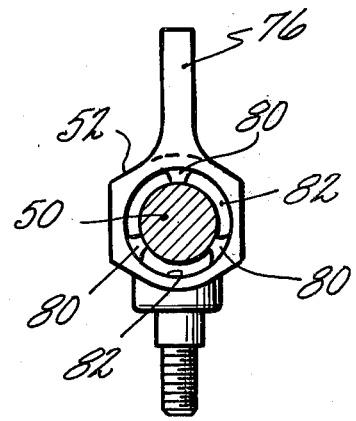

ENGINE AIR PARTICLE SEPARATOR FOR USE WITH GAS TURBINE ENGINE

BACKGROUND OF THE INVENTION

1. Field of the Invention

This invention relates to engine air particle separators with blow-in doors which are pneumatically operated so that the application of actuating air to the actuator will close the doors and so that the actuator will not permit the doors to open so long as there is actuating air applied thereto despite the fact that the actuating air falls below a predetermined limit.

2. Description of the Prior Art

In the engine air particle separator art, dual path engine air particle separators have been used to provide both an air cleansing path and a direct flow path for engine air to enter the engine inlet, and actuatable blow-in doors have been used at the inlet to the direct path, however, these prior art separators experience the problem that when the actuating pressure falls below specified pressures, the engine inlet doors would open permitting contaminated air to enter the engine through the direct flow path of separator, rather than flowing through the cleaning path as desired.

SUMMARY OF THE INVENTION

It is a primary object of this invention to provide such an engine air particle separator (hereinafter EAPS) in which the separator doors may be actuated so that air must enter the engine through the air cleansing path whenever pneumatic pressure is provided to the door actuator, and wherein the actuator is made inoperative to permit the doors to open when the actuating pressure is applied thereto but falls below a preselected limit, and wherein the actuator can move to permit door closing when the operating air is removed from the actuator.

In accordance with the present invention, the EAPS blow-in door actuator is inactivated over an interim range of actuating pressure, in which interim range of the actuator would otherwise permit the doors to open in contradiction to pilot command.

In accordance with the present invention, mechanism is provided which provides a signal to the pilot as to the position of the EAPS blow-in actuator.

Other objects and advantages of the present invention may be seen by referring to the following description and claims, read in conjunction with the accompanying drawings.

BRIEF DESCRIPTION OF THE DRAWINGS

FIG. 1 is a cross-sectional showing of a conventional EAPS.

FIG. 2 is a front view of the EAPS shown in FIG. 1 and is partially broken away to show the blow-in door actuator.

FIG. 3 is a showing of the actuator, partially broken away to illustrate its construction and its connections to the blow-in doors of EAPS.

FIG. 4 is an enlarged cross-sectional showing of the actuator piston rod and connection to one of the EAPS doors.

FIGS. 5a through 5e correspond to FIG. 4 and show the piston rod end of the blow-in door actuator in various operating conditions. FIG. 5a shows the actuator under full actuating pressure and with the doors closed. FIG. 5b shows the condition of the piston rod end mechanism and the prevent spring with the actuator doors closed but with the actuating pressure reduced substantially to an interim pressure range so that, unless otherwise prevented, the doors would open. FIG. 5c shows the condition of the piston rod end mechanism and the prevent spring at the instant that the pilot has bypassed or cuts off actuating pressure supply such that the spool at the end of the piston rod contacts the preventing spring causing it to move outwardly as the doors commence to open. FIG. 5d shows the condition of the piston rod end mechanism and the prevent spring during door opening operation and when there is no actuating pressure applied to the actuator. FIG. 5e shows the condition of the piston rod end mechanism and the prevent spring when the doors are fully open and the actuator is without actuating pressure.

FIG. 6 is a cross-sectional showing through the spool member and the linkage member at the end of the actuator piston rod showing their self-cleaning construction.

DESCRIPTION OF THE PREFERRED EMBODIMENT

Referring to FIGS. 1 and 2 we see EAPS 10 connected in conventional fashion to the inlet of gas turbine engine 12, possibly through a flanged bolting arrangement 14. In my preferred embodiment, gas turbine engine 12 is used to power a helicopter. EAPS 10, which is shown to be circular in cross section but could well be of other shapes, includes spaced, concentric walls of circular cross section 16 and 18 which define annular chamber 20 therebetween and which have a plurality of particle separating tubes, one of which is shown at 22 extending thereacross and preferably positioned in both circumferential and axial array about the entire annular chamber 20. Inner duct member defines cylindrical passage 24 therewithin. Blow-in doors 26 are positioned at the inlet end of passage 24 to block flow therethrough when in their closed position. As described hereinafter, when the inlet doors 26 are in their open position, ram air may flow directly into cylindrical passage 24 and therefrom directly into the inlet of engine 12 since, preferably, EAPS 10 and engine 12 are both concentric about axis 28.

When blow-in doors 26 are closed, all air entering the inlet of engine 12 must pass through the plurality of particle separating tubes 22, which operate in centrifugal separator fashion, to separate foreign particles from the air, depositing foreign articles so removed into chamber 20 and permitting clean air only to pass into chamber 24 and from there into the inlet of engine 12. Separated particles are scavenged from chamber 20 through fan-operated scavenge duct 30. Accordingly when the blow-in doors 26 are closed, all air entering engine 12 must be cleansed in its passage through the plurality of centrifugal separator tubes 22. When blow-in doors 26 are opened, ram air may enter directly into passage 24 and therefore directly into the inlet of engine 12 in minimal pressure loss fashion.

It is conventional practice to close inlet doors 26 when the helicopter, or other vehicle being powered by engine 12, is operating in contaminated air, such as a dust cloud, thereby requiring all air to be cleansed by passing through separator tubes 22 before entering engine 12. Once the vehicle is clear of the air-contaminated area, blow-in doors 26 may be opened and the minimal flow loss passage through chamber 24 into the engine 12 is available for engine air. As best shown in FIG. 2, blow-in doors 26 are preferably formed in two halves, 26a and 26b, with each half pivotally mounted at the inlet of chamber 26 to be pivotally actuatable with door hinge rods 32a and 32b.

EAPS 10 has been described sufficiently to permit description of the improved version thereof taught herein, and is described in greater particularity in U.S. Pat. Nos. 3,421,296, 3,449,891 and 3,811,254 to which reference is hereby made.

Pneumatic actuator 34 is preferably encased between walls 16 and 18 and is floatingly supported from and pivotally connected to crank members 36 and 38, as best shown in FIG. 3. Crank members 36 and 38 are, in turn, supported from door hinge rods 32a and 32b, respectively, for pivot motion therewith. Actuator 34 is a conventional pneumatic cylinder-piston mechanism to which actuating air is preferably provided as bleed air from engine 12 in response to pilot or control actuation of on-off valve 40, which is located in conduit 42. Floating cylinder 44 of actuator 34 is shown partially broken away in FIG. 3 to show piston 46 therewithin, which piston is connected in conventional fashion to piston rod 48, which extends beyond cylinder 44 leftwardly as viewed in FIG. 3, and, as best shown in FIG. 4, carries spool member 50 integrally or threadably attached thereto at its outboard end, which spool member 50 is slidably sleeved into actuator door linkage member 52. Biasing spring 54 (FIG. 3) extends between cylinder 44 and piston 46 to bias piston 46 in a rightward direction so as to collapse or shorten the overall length of actuator 34, thereby causing link members 36 and 38 to pivot toward each other in a clockwise and counterclockwise direction, respectively, as viewed in FIG. 3, to thereby cause blow-in door hinge rods 32a and 32b to pivot similarly and thereby bring the blow-in doors 26a and 26b to their open position.

With blow-in doors in their open position and blow-in door actuator 34 in its collapsed position, when the pilot wants blow-in doors 26 to be closed, he opens valve 40 which ducts engine bleed actuating air from engine 12 through conduit 42 into cylinder 44 to force piston 48 leftwardly as shown in FIG. 3 against the force of spring 54 to move actuator 34, piston 46 and hence piston rod 48 to their fully extended positions shown in FIG. 3, thereby causing link members 36 and 38, and hence door hinge rods 32a and 32b and the blow-in doors 26a and 26b, to pivot in the opposite direction to thereby close the blow-in doors. With blow-in doors 26 so closed, all air entering engine 12 must be cleansed in passing through the array of separators 22. When the pilot wishes to have engine inlet air enter the engine inlet directly with ram assist through passage 24, valve 40 is shut-off, thereby removing pressure from the interior of cylinder 44 and acting against piston 46, so that the coaction of the biasing spring 54 and the ram air acting against the blow-in doors 26 will cause the actuator 34 to move to its retracted or collapsed position as the blow-in doors open.

Conventional pneumatic actuators have been found to be inadequate in operating the doors of an EAPS because, under at least two helicopter operating conditions, the pilot will have opened valve 40 to provide engine bleed air to actuator 34 to thereby close the doors, however, the actuator actuating pressure can be reduced sufficiently under these two aforementioned conditions such that, while biasing spring 54 remains compressed, it is not sufficently compressed to hold blow-in doors 26 closed in view of the aerodynamic pressures acting thereagainst. This condition can occur when EAPS is used in a helicopter both when the engine 12 is operating at idle and hence the bleed air is reduced beyond a preselected limit, and when the helicopter is operating at low speed on the ground and the negative pressure created by the engine on the downstream side of the doors will cause the doors to open in opposition to pilot command.

It will accordingly be seen that while the object of actuator 34 is to close and maintain the EAPS blow-in doors closed when the pilot actuates valve 40 to provide engine bleed air to the actuator, and so that the doors will open when the pilot removes engine bleed air from the actuator by closing valve 40 and thereby permitting the aerodynamic loading on the doors plus the biasing of spring 54 to bring the actuator to its collapsed position and to open the doors, pilot commands can be overruled in prior art actuators under at least the two aforementioned operating conditions.

I have fabricated my actuator 34 so that the blow-in doors are closed thereby, and remain closed, when the actuating pressure applied thereto from engine 12 exceeds a preselected limit, such that my actuator is prevented from moving to or towards an EAPS door-open position when the actuating air so supplied falls below that predetermined pressure, and so that when the actuating pressure falls sufficiently below that predetermined pressure or is turned off completely, my actuator is spring-biased and blow-in door aerodynamically biased to move to its collapsed, door-open position.

This improved EAPS can best be understood by viewing FIGS. 4 and 5a through 5e.

As previously explained in connection with FIG. 4, spool member 50 is threadably attached to and moves with the outer end of piston rod 48 and is slidably received in sleeve fashion within linkage member 52 which is connected, as shown in FIG. 3, so that as the piston rod 48 reciprocates, crank 36 is caused to pivot and thereby causing door hinge rod 32a to pivot therewith to open or close one of the blow-in doors 26a. Similarly, the opposite end of floating cylinder 44 is pivotally connected to link 38 to cause pivoting motion thereof and hence pivoting motion of the other blow-in door rod 32b in accordance with pilot command.

To better understand the operation of my improved EAPS, attention will now be directed to FIGS. 5a through 5e. FIG. 5a shows the condition of piston rod 48 when full actuating pressure, which may be about 100 psi, is applied to actuator 34 when the pilot opens valve 40 to permit engine bleed air to flow through passage 42 into actuator 34. Piston 46, which may be about 1 inch in diameter, moves to its full leftward or extended position and carried spool member 50 and link member 52 therewith to close door 26. U-shaped spring member 60, which is supported as best shown in FIG. 3 from the leftward end of cylinder 44, is spring-biased inwardly against piston rod 48. In the FIG. 5a condition, the doors 26 are in their fully closed position and the high actuating pressure within cylinder 44 is holding piston rod 48 in its FIG. 5a, fully extended position. If the actuating pressure within actuator 34 diminished to a partial pressure, for example about 20 psi at helicopter ground idle, the combined force of the biasing spring 54 and the aerodynamic loading on doors 26 will bring linkage member 52 into contact with U-shaped spring 60 as shown in FIG. 5b. In the 5b condition the blow-in doors remained closed and can not open due to the prevent action of spring 60. As the pressure in the actuator 34 reduces further, the coaction of the biasing spring 54 and the aerodynamic loading on the door causes spool member 50 to move rightwardly within linkage member 52, as piston 46 moves rightwardly within floating cylinder 44, to a position where spool member rim 62 bears against the selectively shaped surfaces 60a of a U-shaped spring 60 and commences forcing spring 60 ourwardly as shown in FIG. 5c until, as best shown in FIG. 5d, doors 26 continue to open as piston rod 48, spool member 50 and linkage member 52 continue their rightward motion such that U-shaped spring 60 no longer presents a motion-retarding force to the actuator 34 and, eventually, with blow-in doors 26 fully opened, the piston rod 48, spool member 50, linkage member 52 and spring 60 are positioned in their FIG. 5e position, where doors 26 are fully open and actuating pressure is zero.

The angle of spring 60 is important because it acts to provide the proper mechanical advantage to the biasing spring 54 which requires, approximately 12 lbs. to be fully compressed, to overcome the forces applied to U-shaped spring 60 by blow-in doors 26 through linkage member 52.

As best shown in FIG. 6, spool member 50 is supported in linkage mechanism 52 by a plurality of circumferentially spaced, axially extending keyways 80 so that substantial chambers 82 are formed between the outer surface of spool 50 and linkage member 52. Due to this construction, there is minimum friction as spool 50 moves within member 52, and any foreign particles such as sand which might otherwise become lodged between members 50 and 52, will enter chambers 82 to be cleared therefrom. This is a self cleaning feature.

In view of the fact that cylinder 44 is free floating, and because actuator 34 is suspended between pivotable links 36 and 38, it will be realized that as piston 46 moves within floating cylinder 44, links 36 and 38 will be pivoted in opposite directions to cause simultaneously closing or opening of blow-in doors 26a and 26b. As the actuator 34 is actuated to its fully extended position shown in FIG. 3, link 36 has pivoted clockwise to its end position, while link 38 has pivoted counterclockwise to its end position. When pressure is removed from actuator 34 and the actuator collapses, links 36 and 38 pivot in the opposite direction, counterclockwise and clockwise, respectively, as the doors open.

So that the pilot will know the condition of the blow-in doors 26a and 26b microswitches 70 and 72 are selectively positioned on cylinder 44 so that, as contact rod 74 moves with piston 46 relative to cylinder 44, rod contact surface 76 will contact microswitch 70 when the actuator is in its fully extended, door-closed position and will contact microswitch 72 when the actuator is in its fully collapsed, door-open position. Contact rod 74 is caused to move with piston 46 in view of the fact that it is looped over lug member 76 which projects from linkage member 53, as shown in FIG. 4.

It will therefore be seen that in operation, my improved EAPS can be brought to the door-closed position by the pilot opening valve 40 to permit engine bleed air to actuate pneumatic actuator 34 to its fully extended FIG. 3 position and doors 26 will be closed thereby and remain closed so long as the actuating air is above a predetermined limit, about 20 psi in my preferred embodiment. When the actuating air falls below that predetermined limit, the combined action of biasing spring 54 and the aerodynamic loading on blow-in doors 26 will tend to urge piston 46 rightwardly relative to cylinder 44, as viewed in FIG. 3, to commence the opening of doors 26. However, this rightward motion of piston 46 relative to cylinder 48 and the opening of doors 26 are prevented by U-shaped spring member 60 when in its FIG. 5b condition. When however, the actuating pressure falls sufficiently below the preselected pressure or is eliminated, the action of the biasing spring 54 causes spool member 50 to contact spring member 60 to force that spring member to its inactive FIG. 5a and 5e positions so that when there is zero pressure acting in actuator 34, the actuator is in its fully collapsed FIG. 5e position with the actuator doors 26 fully open.

I wish it to be understood that I do not desire to be limited to the exact details of construction shown and described, for obvious modifications will occur to a person skilled in the art.

I claim:

1. An engine air particle separator adapted to be connected to the inlet of a gas turbine engine to control air flow thereto and comprising:
    (A) first flow path defining means connecting the engine inlet to atmosphere and fabricated to separate foreign particles from the air passing therethrough to the engine,
    (B) second flow path defining means connecting the engine inlet directly to atmosphere therethrough and oriented so that ram air may be directed therethrough into said engine inlet with minimal pressure loss,
    (C) door means in said second flow path defining means actuatable between a closed position wherein air flow through the second means is blocked so that all air entering the engine must flow through the first means, and an open position wherein air flow through said second means is permitted,
    (D) pressure responsive door actuating means which is spring biased to cooperate with ram air door loading to normally retain the door means in said open position, and which is responsive to applied operating pressure to overcome the force of the spring bias and the ram air door loading to move the door means to the closed position,
    (E) means to supply operating pressure to said door actuating means to actuate said closed position and to remove operating pressure from said door actuating means to permit said door means to move to said open position, and
    (F) means to prevent said door means from moving to said open position when the actuating pressure is supplied to said actuating means from said supply means but has fallen below a predetermined pressure.

2. An engine air particle separator according to claim 1 wherein said door actuating means comprises a pressure operated cylinder-piston mechanism operably connected to said door means so that relative motion between the piston and cylinder will cause motion of the door means.

3. An engine air particle separator according to claim 2 wherein said cylinder-piston mechanism is operable between an extended and a collapsed position, and when said cylinder-piston mechanism is in its extended position, said door means are in their closed position and wherein when said cylinder-piston mechanism is in its collapsed position said door means are in its open position.

4. An engine air particle separator according to claim 3 and including a gas turbine engine operably connected to said separator, and operable to produce a bleed air supply; and wherein said pressure supply means is said engine bleed air supply.

5. An engine air particle separator according to claim 4 and including means to either supply or discontinue supply of said operating pressure to said actuating means.

6. An engine air particle separator according to claim 3 and wherein said prevent means comprises a spring member extending between the piston rod and the cylinder of the cylinder-piston mechanism and operable to retain the cylinder-piston mechanism in its extended position when said operating pressure supplied thereto is above a predetermined value.

7. An engine air particle separator according to claim 6 and including means to deviate said spring means when said operating pressure is removed from said actuating means.

8. An engine air particle separator according to claim 7 wherein said door means are double doors mounted for pivot motion in opposite directions between their open and closed positions, and wherein said door actuating means is a floating cylinder-piston mechanism and includes:

(A) a pivotal crank member connected to each door of the double doors, and with one crank member connected to the free end of the piston rod and the other crank member connected to the opposite end of the free floating cylinder so that application of actuating air at operating pressure to said actuating means will cause pneumatic actuation of said actuating means to its extended position so as to cause said pivotal crank members and hence said doors to pivot to their open positions, and wherein withdrawal of said operating pressure from said actuating means will permit the spring biased cylinder-piston mechanism to collapse to its collapsed position as said doors pivot to their open position, (B) a spool member connected to the free end of the piston rod, (C) a linkage member connected to said crank member and sleeved over said spool member, and (D) wherein said prevent means is a U-shaped spring member extending between the cylinder of the actuating means and said linkage member and operable so that when said cylinder-piston mechanism is in its extended position said spring member is inoperative, so that when the operating pressure falls below a preselected limit, said spring member contacts both the cylinder and the linkage member to prevent collapsing motion therebetween so long as operating pressure is supplied to said cylinder-piston mechanism, and wherein movement of said spool member within said linkage member when the operating pressure is removed from cylinder-piston mechanism causes said spool member to cause said spring member to become inoperative, thereby permitting the cylinder-piston mechanism to move to its collapsed position.

9. An engine air particle separator according to claim 8 and wherein said spool member has a cylindrical exterior surface and wherein said linkage member has circumferentially spaced, axially extending rib members which slidably and supportably engage said spool member to define substantial circumferential chambers therebetween, thereby providing chambers for any foreign particles which would otherwise be wedged between the spool and linkage member to pass free through said chambers in a self cleaning function.

10. An engine air particle separator according to claim 1 wherein said prevent means is operable only when the operating pressure supplied to the actuating means is in an interim range between full pressure and zero pressure so as to prevent opening of said door means when the operating pressure is within said interim range and so as to permit opening of said door means when said operating pressure is below said interim range.

* * * * *